United States Patent [19]

Kubitza et al.

[11] Patent Number: 5,075,370
[45] Date of Patent: Dec. 24, 1991

[54] AQUEOUS COATING COMPOSITION BASED ON SPECIFIC TWO-COMPONENT POLYURETHANES AND TO A PROCESS FOR ITS PRODUCTION

[75] Inventors: Werner Kubitza; Hermann Gruber; Joachim Probst, all of Leverkusen, Fed. Rep. of Germany

[73] Assignee: Bayer Aktiengesellschaft, Leverkusen, Fed. Rep. of Germany

[21] Appl. No.: 395,849

[22] Filed: Aug. 18, 1989

[30] Foreign Application Priority Data

Sep. 1, 1988 [DE] Fed. Rep. of Germany ....... 3829587

[51] Int. Cl.$^5$ .................. C09D 175/16; C08L 75/16; C08G 18/67
[52] U.S. Cl. ...................................... 524/591; 528/75
[58] Field of Search ......................................... 524/591

[56] References Cited

U.S. PATENT DOCUMENTS

| | | | |
|---|---|---|---|
| 4,186,118 | 1/1980 | Reischl et al. | 260/29.2 |
| 4,389,509 | 6/1983 | Pampouchidis et al. | 524/591 |
| 4,622,360 | 11/1986 | Gomi et al. | 524/591 |
| 4,711,918 | 12/1987 | Kubitza et al. | 524/196 |
| 4,730,021 | 3/1988 | Zom et al. | 524/591 |
| 4,870,129 | 9/1989 | Henning et al. | 524/591 |
| 4,945,128 | 7/1990 | Hille et al. | 524/591 |
| 4,948,829 | 8/1990 | Mitsuji et al. | 524/591 |

FOREIGN PATENT DOCUMENTS

| | | |
|---|---|---|
| 2643642 | 3/1978 | Fed. Rep. of Germany . |
| 1162409 | 8/1969 | United Kingdom . |
| 1530021 | 10/1978 | United Kingdom . |
| 1530022 | 10/1978 | United Kingdom . |

Primary Examiner—John Kight, III
Assistant Examiner—Rabon Sergent
Attorney, Agent, or Firm—Joseph C. Gil; Thomas W. Roy

[57] ABSTRACT

The present invention is directed to a two-component coating composition which contains as binder components a) a polyol component containing at least one hydroxyl-containing polymer having chemically incorporated carboxylate and/or sulfonate groups and based on olefinically unsaturated compounds and b) a polyisocyanate component having a viscosity at 23° C. of about 50 to 10,000 mPa.s and based on at least one organic polyisocyanate in quantities corresponding to an NCO/OH equivalent ratio of about 0.5:1 to 5:1, characterized in that component a) is an aqueous solution and/or dispersion of a polymer containing hydroxyl groups in which the polyisocyanate component b) is present in emulsified form.

The present invention also relates to a process for the production of this coating composition which is characterized in that a polyisocyanate component having a viscosity at 23° C. of about 50 to 10,000 mPa.s and based on at least one organic polyisocyanate is emulsified in an aqueous solution or dispersion of one or more polymer resins containing hydroxyl groups and chemically incorporated sulfonate and/or carboxylate groups in a quantity which makes them soluble and/or dispersible in water, the quantitative ratios between the two components corresponding to an NCO/OH equivalent ratio, based on the isocyanate groups of the polyisocyanate component and the incorporated hydroxyl groups of the polymer component, of about 0.5:1 to 5:1.

8 Claims, No Drawings

AQUEOUS COATING COMPOSITION BASED ON SPECIFIC TWO-COMPONENT POLYURETHANES AND TO A PROCESS FOR ITS PRODUCTION

BACKGROUND OF THE INVENTION

1. Field of the Invention

This invention relates to an aqueous coating composition based on specific two-component polyurethanes and to a process for its production.

2. Description of the Prior Art

Ecological factors play an important part in surface technology. A particularly urgent problem is to reduce the organic solvents used for paints and coating compositions.

Previously, it has not been possible to prepare the highest quality chemically cross-linking polyurethane paints without organic solvents. These paints by virtue of their outstanding properties have acquired considerable significance in the coatings field. The use of water instead of organic solvents in two-component polyurethane paints based on polyisocyanates containing free isocyanate groups has not been possible because it is known that isocyanate groups react not only with alcoholic hydroxyl groups, but also with water. In addition, the concentration of active hydrogen atoms emanating from the water in these systems is far higher than the concentration of hydroxyl groups in the organic NCO-reactive component. Therefore, it had to be assumed that, in the ternary system of polyisocyanate, organic polyhydroxyl compound and water, the isocyanate/water reaction predominates with formation of urea and carbon dioxide. This reaction does not lead to cross-linking of the organic polyhydroxyl compounds and results in foaming of the paint mixture through the formation of carbon dioxide.

Although it is known from DE-OS 2 708 442 and from DE-OS 3 529 249 that organic polyisocyanates can be added to aqueous polymer dispersions to improve the property spectrum, these polymer dispersions are not organic polyhydroxyl compounds of the type normally used in polyurethane chemistry as reactants for polyisocyanates. Further, the effect described in these prior publications of adding polyisocyanates to aqueous polymer dispersions is presumably attributable to coating the dispersed polymer with the urea formed from polyisocyanate and water.

It has now surprisingly been found that it is possible by using selected organic polyhydroxyl compounds, i.e. polyhydroxypolyacrylates of the type described in detail hereinafter, as reactants for organic polyisocyanates containing free isocyanate groups to produce aqueous two-component polyurethane coating compositions by emulsifying the polyisocyanates containing free isocyanate groups in the aqueous polymer solution or dispersion. The coating compositions according to the invention have a pot life of several hours and harden to form high-quality, cross-linked films which have comparable properties to known coatings obtained from solvent-containing two-component polyurethane lacquers. This is extremely surprising for the reasons explained above because it had been expected that such a selective reaction would not take place between the polyisocyanate and the hydroxyl-containing polymer when dissolved or dispersed in water.

SUMMARY OF THE INVENTION

The present invention is directed to a two-component coating composition which contains as binder components a) a polyol component containing at least one hydroxyl-containing polymer having chemically incorporated carboxylate and/or sulfonate groups and based on olefinically unsaturated compounds and b) a polyisocyanate component having a viscosity at 23° C. of about 50 to 10,000 mPa.s and based on at least one organic polyisocyanate in quantities corresponding to an NCO/OH equivalent ratio of about 0.5:1 to 5:1, characterized in that component a) is an aqueous solution and/or dispersion of a polymer containing hydroxyl groups in which the polyisocyanate component b) is present in emulsified form.

The present invention also relates to a process for the production of this coating composition which is characterized in that a polyisocyanate component having a viscosity at 23° C. of about 50 to 10,000 mPa.s and based on at least one organic polyisocyanate is emulsified in an aqueous solution or dispersion of one or more polymer resins containing hydroxyl groups and chemically incorporated sulfonate and/or carboxylate groups in a quantity which makes them soluble and/or dispersible in water, the quantitative ratios between the two components corresponding to an NCO/OH equivalent ratio, based on the isocyanate groups of the polyisocyanate component and the incorporated hydroxyl groups of the polymer component, of about 0.5:1 to 5:1.

DETAILED DESCRIPTION OF THE INVENTION

Component a) is based on polymers of olefinically unsaturated monomers containing hydroxyl groups, sulfonate and/or carboxylate groups, preferably carboxylate groups and, optionally, sulfonic acid and/or carboxyl groups, preferably carboxyl groups. These polymers have a molecular weight $M_n$ (number average), as determined by gel permeation chromatography, of about 500 to 50,000, preferably about 1,000 to 10,000; a hydroxyl value of about 16.5 to 264, preferably about 33 to 165 mg KOH/g of polymer; an acid value (based on the optional unneutralized sulfonic acid and/or carboxyl groups) of about 0 to 150, preferably about 0 to 100 mg KOH/g of polymer; and a content of sulfonate and/or carboxylate groups of 5 to 417, preferably 24 to 278 milliequivalents per 100 g of polymer (solids). In a particularly preferred embodiment, these anionic groups are carboxylate groups.

The polymer resins a) are used for the production of the coating compositions in the form of about 10 to 50% by weight, preferably about 20 to 40% by weight aqueous solutions and/or dispersions which have a viscosity of about 10 to $10^5$, preferably about 100 to 10,000 mPa.s/23° C. and a pH value of about 5 to 10, preferably about 6 to 9.

Depending upon the molecular weight of the polymers and their content of anionic groups or free acid groups, the aqueous systems containing the polymers may be either colloidal dispersions or molecular dispersions, but are generally so-called "partial dispersions," i.e., aqueous systems which are part molecular dispersions and part colloidal dispersions.

The polymers containing hydroxyl groups are produced in known manner by copolymerization of olefinically unsaturated monomers, both monomers containing hydroxyl groups and monomers containing acid groups (i.e. sulfonic acid groups or carboxyl groups, preferably carboxyl groups) being copolymerized as the monomers, generally admixed with other monomers, after which the acid groups are at least partly neutralized.

The monomers containing acid groups are used for the purpose of incorporating carboxyl and/or sulfonic acid groups in the copolymers which, by virtue of their hydrophilic nature, ensure the solubility or dispersibility in water of the polymers, particularly after at least partial neutralization of the acid groups. The quantity of "acidic" comonomers used and the degree of neutralization of the "acidic" polymers initially obtained are selected in accordance with the following guidelines. In general, the "acidic" comonomers are used in quantities of about 1 to 30% by weight, preferably in quantities of about 5 to 20% by weight, based on the total weight of the monomers used. When less than 5% by weight of "acidic" monomers are used, the aqueous dispersions contain at most a low percentage of polymers in the form of a molecular dispersion even after complete neutralization. Larger contents of "acidic" monomers at the same degree of neutralization produce increasing percentages of polymers in the form of molecular dispersions until the colloidal dispersion components disappear at contents above about 12% by weight.

In principle, suitable "acidic" comonomers are any olefinically unsaturated, polymerizable compounds which contain at least one carboxyl and/or sulfonic acid group, e.g., olefinically unsaturated mono- or dicarboxylic acids having a molecular weight of 72 to 207 (such as acrylic acid, methacrylic acid, maleic acid or itaconic acid) or olefinically unsaturated compounds containing sulfonic acid groups such as 2-acrylamido-2-methylpropanesulfonic acid, or mixtures of such olefinically unsaturated acids.

The monomers containing hydroxyl groups are used in such quantities that the polymers have the hydroxyl values set forth above which correspond to a hydroxyl group content of the polymers of about 0.5 to 8, preferably 1 to 5% by weight. In general, the hydroxyfunctional comonomers are used in quantities of about 3 to 75% by weight, preferably about 6 to 47% by weight, based on the total weight of the monomers used. In addition, it is important to ensure that the quantity of hydroxyfunctional monomers is selected to provide copolymers containing an average of at least two hydroxyl groups per molecule.

Suitable monomers containing hydroxyl groups include, in particular, hydroxyalkyl esters of acrylic acid or methacrylic acid preferably containing 2 to 4 carbon atoms in the alkyl radical such as 2-hydroxyethyl acrylate or methacrylate, 2- or 3-hydroxypropyl acrylate or methacrylate, the isomeric hydroxybutyl acrylates or methacrylates and mixtures of such monomers.

The third group of olefinically unsaturated monomers which may be used for the production of the copolymers are olefinically unsaturated compounds which contain neither acidic nor hydroxyl groups. These compounds include esters of acrylic acid or methacrylic acid containing from 1 to 18, preferably from 1 to 8 carbon atoms in the alcohol radical, such as methyl acrylate, ethyl acrylate, isopropyl acrylate, n-propyl acrylate, n-butyl acrylate, 2-ethylhexyl acrylate, n-stearyl acrylate, the methacrylates corresponding to these acrylates, styrene, alkylsubstituted styrenes, acrylonitrile, methacrylonitrile, vinyl acetate, vinyl stearate and mixtures of such monomers. Comonomers containing epoxide groups such as glycidyl acrylate or methacrylate or monomers such as N-methoxymethyl acrylamide or methacrylamide may be used in small quantities.

The monomers of this third group are used in quantities of up to 90% by weight, preferably about 40 to 80% by weight, based on the total weight of the monomers used.

The polymers may be produced by standard polymerization processes. The polymers are preferably produced in organic solution. Continuous or discontinuous polymerization processes may be applied. Among the discontinuous processes, the batch process and inflow process may be used, the inflow process being preferred. In the inflow process, the solvent is initially introduced by itself or with part of the monomer mixture and heated to the polymerization temperature. The polymerization reaction is radically initiated when the monomers have been initially introduced and the remaining monomer mixture is added together with an initiator mixture over a period of about 1 to 10 hours, preferably about 3 to 6 hours. Thereafter more activator may optionally be added to take the polymerization to a conversion of at least 99%.

Suitable solvents include aromatic hydrocarbons such as benzene, toluene, xylene and chlorobenzene; esters such as ethyl acetate, butyl acetate, methyl glycol acetate, ethyl glycol acetate and methoxypropyl acetate; ethers such as butyl glycol, tetrahydrofuran, dioxane and ethyl glycol ether; ketones such as acetone and methyl ethyl ketone; halogen-containing solvents such as methylene chloride and trichloromonofluoroethane; and mixtures of these solvents.

The polymerization may be initiated by initiators having a decomposition half time at 80° to 180° C. of about 0.01 to 400 minutes. In general, the copolymerization reaction takes place at temperatures in the range previously set forth, preferably at a temperature of about 100° to 160° C. under a pressure of about 1000 to 20,000 mbar. The exact polymerization temperature is determined by the type of initiator used. The initiators are used in quantities of about 0.05 to 6% by weight, based on the total quantity of monomers.

Suitable initiators include aliphatic azo compounds such as azoisobutyronitrile and peroxides such as dibenzoyl peroxide, t-butyl perpivalate, t-butyl per-2-ethylhexanoate, t-butyl perbenzoate, t-butyl hydroperoxide, di-t-butyl peroxide, cumene hydroperoxide and dicyclohexyl and dibenzyl peroxydicarbonate.

The molecular weight of the polymers may be regulated by standard regulators such as n-dodecylmercaptan, diisopropyl xanthogene disulfide, di-(methylenetrimethylolpropane)-xanthogene disulfide and thioglycol. They are added in quantities of up to about 3% by weight, based on the monomer mixture.

On completion of polymerization, the copolymers are converted into an aqueous solution or dispersion. The organic polymer solution is introduced into a preheated aqueous phase and, at the same time, the organic solvent is removed by distillation, preferably under vacuum. To obtain good solubility or dispersibility in water, a neutralizing agent such as an inorganic base, ammonia or an amine, is preferably added to the aqueous phase. Inorganic bases include sodium hydroxide and potassium hydroxide, while the amines, in addition to ammonia, include trimethylamine, triethylamine and dimethyl ethanolamine. The neutralizing agents may be used in either substoichiometric or excess quantities to produce the above-mentioned acid values and contents of sulfonate and/or carboxylate groups, particularly carboxylate groups. When the acidic groups present are completely neutralized, an acid value of zero is obtained, while the content of sulfonate and/or carboxylate groups corresponds to the original content of sulfonic acid groups or carboxyl groups. When these groups are partially neutralized, the contents of sulfonate and/or carboxylate groups correspond to the quantity of neutralizing agent used. However, it is important to note, particularly when a stoichiometric excess of neutralizing agent is used, that a distinct increase in viscosity can occur through the polyelectrolyte character of the polymers. The aqueous solutions or dispersions obtained have the above-mentioned concentrations and viscosities and generally contain less than 5% by weight, preferably less than 2% by weight of residual solvent. The substantially complete removal even of solvents boiling at higher temperatures than water is possible by azeotropic distillation.

The polyisocyanate component b) may be any organic polyisocyanate cyanate containing aliphatically, cycloaliphatically, araliphatically and/or aromatically bound isocyanate groups which are liquid at room temperature. The polyisocyanate component generally has a viscosity at 23° C. of about 50 to 10,000, preferably about 50 to 1,000 mPa.s and is preferably not modified to be water dispersible or soluble although it may be so modified in a less preferred embodiment. The polyisocyanate component b) is preferably a polyisocyanate or polyisocyanate mixture exclusively containing aliphatically and/or cycloaliphatically bound isocyanate groups and having an (average) NCO functionality of about 2.2 to 5.0 and a viscosity at 23° C. of about 50 to 500 mPa.s.

If necessary, the polyisocyanates may be used in admixture with small quantities of inert solvents to reduce the viscosity to a value within the limits mentioned. However, the maximum quantity in which such a solvent is used is determined such that the coating compositions according to the invention contain at most 20% by weight of solvent, based on the quantity of water, including the solvent, if any, still present in the polymer dispersions or solutions. Suitable solvents for the polyisocyanates include aromatic hydrocarbons such as "solvent naphtha," or the solvents set forth as suitable for the polyol component.

Suitable polyisocyanates include, in particular, the so-called "paint polyisocyanates" containing aromatically or (cyclo)aliphatically bound isocyanate groups; as already stated, (cyclo)aliphatic polyisocyanates are particularly preferred. Particularly suitable "paint polyisocyanates" include those based on hexamethylene diisocyanate, 1-isocyanato-3,3,5-trimethyl-5-isocyanatomethyl cyclohexane (IPDI) and/or bis-(isocyanatocyclohexyl)-methane, particularly those based on hexamethylene diisocyanate. "Paint polyisocyanates" based on these diisocyanates are understood to be the biuret, urethane, uretdione and/or isocyanurate derivatives of these diisocyanates which, after their production, have been freed in known manner, preferably by distillation, from excess starting diisocyanate to a residual content of less than 0.5% by weight. Preferred aliphatic polyisocyanates for use in accordance with the invention include biuret polyisocyanates based on hexamethylene diisocyanate which correspond to the criteria mentioned above and which are based on mixtures of N,N′,N″-tris-(6-isocyanatohexyl)biuret with small quantities of its higher homologs. These polyisocyanates may be obtained by the processes according to U.S. Pat. Nos. 3,124,605; 3,358,010; 3,903,126; 3,903,127 or 3,976,622. Also preferred are the cyclic trimers of hexamethylene diisocyanate corresponding to the criteria mentioned above which may be obtained in accordance with U.S. Pat. No. 4,324,879 and which are based on N,N′N″-tris-(6-isocyanatohexyl)-isocyanurate in admixture with small quantities of its higher homologs. It is particularly preferred to use mixtures corresponding to the criteria mentioned of uretdione and/or isocyanurate polyisocyanates based on hexamethylene diisocyanate of the type formed by the catalytic oligomerization of hexamethylene diisocyanate using trialkyl phosphines. The last-mentioned mixtures having a viscosity at 23° C. of about 50 to 500 mPa.s and an NCO functionality of about 2.2 to 5.0 are particularly preferred.

The aromatic polyisocyanates which may also be used in accordance with the invention, but are less preferred, are in particular "paint polyisocyanates" based on 2,4-diisocyanatotoluene or commercial mixtures thereof with 2,6-diisocyanatotoluene or based on 4,4′-diisocyanatodiphenylmethane or mixtures thereof with its isomers and/or higher homologs. Aromatic paint polyisocyanates of this type include the urethane isocyanates obtained by the reaction of excess quantities of 2,4-diisocyanatotoluene with polyhydric alcohols such as trimethylolpropane and subsequent removal of the unreacted diisocyanate excess by distillation. Other aromatic paint polyisocyanates include the trimers of the previously mentioned monomeric diisocyanates which have also been freed from excess monomeric diisocyanates, preferably by distillation, after their production.

It is also possible to use unmodified polyisocyanates of the type mentioned by way of example provided that they correspond to the foregoing requirements with regard to viscosity. In addition, the polyisocyanate component b) may be based on mixtures of the polyisocyanates mentioned by way of example in the foregoing.

To prepare the ready-to-use coating compositions, polyisocyanate component b) is emulsified in an aqueous dispersion of polymer component a). The dissolved or dispersed polymer simultaneously serves as an emulsifier for the polyisocyanate added. Mixing may be carried out by simple stirring at room temperature. The quantity of the polyisocyanate component is selected to provide an NCO:OH equivalent ratio, based on the isocyanate groups of component b) and the alcoholic hydroxyl groups of component a), of about 0.5:1 to 5:1, preferably about 0.8:1 to 2:1.

Before polyisocyanate component b) is added, the auxiliaries and additives typically used in lacquer technology may be incorporated into polymer component a). The auxiliaries and additives include foam inhibitors, levelling aids, pigments, dispersion aids for pigments, etc.

The coating compositions according to the invention thus obtained are suitable for virtually any applications where solvent-containing, solventless or other aqueous paint and coating systems having a high property profile are currently used. Examples include the coating of virtually any mineral building-material surfaces such as lime- and/or cement-bound plasters, gypsum-containing surfaces, fiber-cement building materials and concrete; the painting and sealing of wood and wood-based materials such as particle board, fiberboard and paper;

the painting and coating of metal surfaces; the coating and painting of asphalt or bitumen-containing pavements; and the painting and sealing of various plastic surfaces. They are also suitable for the surface bonding of various materials wherein the materials may be the same or different.

The invention is further illustrated but is not intended to be limited by the following examples in which all parts and percentages are by weight unless otherwise specified.

EXAMPLES

Starting materials:
Polyisocyanate 1

A mixture of 70 parts by weight of a uretdione, i.e. dimerized, hexamethylene diisocyanate containing two terminal NCO groups and 30 parts by weight of N,N',N''-tris-(6-isocyanatohexyl)-isocyanurate in admixture with small quantities of higher homologs of both products. In its solventless form (i.e., 100% solids) polyisocyanate 1 had an average viscosity of 150 mPa.s/23° C. and an average NCO content of 22.5%.

Polyisocyanate 2

N,N',N''-tris-(6-isocyanatohexyl)-biuret containing small quantities of its higher homologs. At 100% solids the product had an average NCO content of 22.5% by weight and an average viscosity of about 3,000 mPa.s/23° C.

Polyisocyanate 3

N,N',N''-tris-(6-isocyanatohexyl)-isocyanurate containing small quantities of higher homologs as obtained in accordance with U.S. Pat. No. 4,324,879. At 100% solids the product had a viscosity of about 3,200 mPa.s/23° C. and an average NCO content of 21.5%.

Polyisocyanate 4

A polyisocyanate prepolymer prepared by reacting 80 parts by weight of polyisocyanate 2 and 20 parts by weight of a saturated polyester of phthalic acid and propylene glycol having a hydroxyl group content of 2%. In the form of a 65% solution in solvent naphtha 100/methoxypropyl acetate (ratio by weight of the solvents 4:1), the prepolymer had an NCO content of 10.4% and a viscosity of 1,300 mPa.a/23° C.

Polyisocyanate 5

A polyisocyanate mixture of the diphenylmethane series; at 100% solids the product had an NCO content of 31% and a viscosity of 120 mPa.s/23° C.

Polymer resins A to H:
Production method:

The starting medium I (cf. Table) was initially introduced into a 3 liter autoclave equipped with a reflux condenser, stirrer and gas inlet and outlet, and purged with nitrogen. Nitrogen was then passed over in a steady stream and the mixture was heated with stirring at approximately 200 rpm to an internal temperature of 110° C. Mixture II was then uniformly added over a period of 4 hours. After the addition, the combined mixtures were stirred for approximately 30 minutes, followed by radical polymerization with mixture III. The reaction time was 6 hours. Thereafter, approximately 100 ml of residual monomers were distilled off together with the solvent, n-butyl acetate, under a vacuum of about 200 to 400 mbar. The quantity distilled off was replaced by fresh solvent. The polymer resins dissolved in the organic solvent had the physical-chemical data shown in the Table.

To convert the organic solution into an aqueous dispersion, the mixtures IV were initially introduced into an 8 liter reactor and heated with stirring to approximately 95° C. The organic polymer solutions were then added over a period of about 0.5 to 1 hour and, at the same time, n-butyl acetate was distilled off by azeotropic distillation. The quantity of water distilled off was continuously replaced. pH values of 7 to 8 were established by addition of an approximately 25% aqueous ammonia solution (or N-dimethyl ethanolamine in Example H). The physical-chemical data of the aqueous polymer dispersions are also shown in the Table. The solvent content of the aqueous partial dispersions ultimately obtained was always below 2%.

|  |  | A | B | C | D | E | F | G | H |
|---|---|---|---|---|---|---|---|---|---|
| I. Starting medium |  |  |  |  |  |  |  |  |  |
| n-Butyl acetate | (g) | 900 | 900 | 900 | 900 | 900 | 900 | 900 | 900 |
| II. |  |  |  |  |  |  |  |  |  |
| 2-Hydroxyethyl methacrylate | (g) | 344 | 459 | 574 | 459 | 459 | 459 | 459 | 459 |
| Methyl methacrylate | (g) | 323 | 266 | 208 | 191 | 116 | 381 | 231 | 381 |
| Styrene | (g) | 323 | 266 | 208 | 191 | 116 | — | — | — |
| n-Butyl acrylate | (g) | 300 | 300 | 300 | 450 | 600 | 450 | 600 | 450 |
| Acrylic acid | (g) | 150 | 150 | 150 | 150 | 150 | 150 | 150 | 150 |
| Azoisobutyronitrile | (g) | 50 | 50 | 50 | 50 | 50 | 50 | 50 | 50 |
| III. |  |  |  |  |  |  |  |  |  |
| t-Butyl peroctoate | (g) | 10 | 10 | 10 | 10 | 10 | 10 | 10 | 10 |
| n-Butyl acetate | (g) | 100 | 100 | 100 | 100 | 100 | 100 | 100 | 100 |
| Concentration (% by weight) |  | 63.7 | 65.3 | 64.4 | 58.8 | 58.6 | 60.9 | 58.9 | 59.1 |
| Viscosity (Pa.s/23 C.) |  | 27.9 | 74.4 | 49.0 | 7.8 | 5.0 | 20.8 | 6.0 | 6.1 |
| Hydroxyl value (mg KOH/g solution) |  | 62.7 | 82.8 | 95.3 | 80.3 | 77.7 | 80.8 | 79.7 | 79.9 |
| Acid value (mg KOH/g solution) |  | 47.3 | 46.8 | 44.6 | 46.1 | 46.1 | 48.6 | 46.6 | 46.5 |
| IV. |  |  |  |  |  |  |  |  |  |
| Deionized water | (g) | 3500 | 3500 | 3500 | 3500 | 3500 | 3500 | 3500 | 3500 |
| Aqueous ammonia solution (25%) | (g) | 143 | 143 | 143 | 143 | 143 | 143 | 143 | — |
| n-Dimethyl ethanol amine | (g) | — | — | — | — | — | — | — | 175 |
| Concentration (% by weight) |  | 26.3 | 30.1 | 30.1 | 24.8 | 26.2 | 27.8 | 26.2 | 30.3 |
| pH value |  | 6.8 | 6.5 | 6.6 | 7.1 | 7.1 | 7.1 | 7.0 | 7.6 |
| Viscosity* (Pa.s/23 C.) |  | — | — | — | 0.97 | 4.6 | 5.7 | 1.8 | — |

| -continued | | | | | | | | |
|---|---|---|---|---|---|---|---|---|
| | A | B | C | D | E | F | G | H |
| Carboxylate groups (Mequiv./100 g solids) | 139 | 139 | 139 | 139 | 139 | 139 | 139 | 131 |
| Acid value (calculated) (mg KOH/g solid resin, after neutralization) | 0 | 0 | 0 | 0 | 0 | 0 | 0 | 4.4 |

*mean values; the viscosities were not constant in view of structural viscosity.

EXAMPLE 1

100.0 parts by weight of polyhydroxyacrylate G having a solids content of 26.2% by weight, a viscosity of 1,800 mPa.s at 23° C. and a pH value of 7.0 were mixed with 8.0 parts by weight of demineralized water, 0.25 parts by weight of a commercial, silicone-containing foam inhibitor (Foamex 1488, a product of Th. Goldschmidt AG, Essen), 0.3 parts by weight of a commercial dispersion aid (Pigmentverteiler A, a product of BASF AG, Ludwigshafen) and 19.0 parts by weight of titanium dioxide, rutile (Bayertitan R-KB4, a product of Bayer AG, Leverkusen) and the resulting mixture was dispersed for approximately 20 minutes in a mixer at a rotational speed of approximately 14 m/second. A dispersion which was storable almost indefinitely was obtained.

a) After the addition of 11.7 parts by weight of polyisocyanate 1, a white-pigmented, water-dilutable two-component polyurethane paint was obtained, having the following composition:

| | By weight |
|---|---|
| Binder | 27.21 |
| Pigment | 13.61 |
| Additive | 0.43 |
| Total solids | 41.25 |
| Water | 58.75 |
| | 100.00 |

The ready-to-use paint contained no organic solvent. The ratio of NCO to OH groups was 1.0 and the pot life was approximately 4 hours.

Films applied in a wet layer thickness of 100 to 600 μm (corresponding to a dry film thickness of 25 to 180 μm) dried in 30 to 120 minutes to form a tack-free and defect-free film. The hardening process was complete after 7 to 14 days.

b) After the addition of 20.0 g of polyisocyanate 4 (which had been diluted to a solids content of 50% with 6 g of solvent naphtha 100) to the dispersion used in a), a ready-to-use, white-pigmented, water-dilutable two-component polyurethane paint was obtained, having the following composition:

| | By weight |
|---|---|
| Binder | 25.54 |
| Pigment | 12.37 |
| Additive | 0.35 |
| Total solids | 38.26 |
| Water | 53.27 |
| Organic solvent | 8.47 |
| | 100.00 |

The mixture as a whole contained only 8.47% by weight of organic solvents. The ratio of NCO to OH groups was 1.0 and the pot life was several hours. Films applied in a wet layer thickness of 100 to 600 μm (corresponding to a dry film thickness of 25 to 180 μm) dried in 30 to 120 minutes to form a tack-free and defect-free film. The hardening process was complete after 7 to 14 days.

c) After the addition of 22.4 parts by weight of polyisocyanate 3 (in the form of a 50% solution in solvent naphtha 100) to the dispersion used in a), a white-pigmented, water-dilutable, two-component polyurethane paint was obtained, having the following composition:

| | By Weight |
|---|---|
| Binder | 24.94 |
| Additive | 0.37 |
| Pigment | 12.67 |
| Total solids | 37.98 |
| Water | 54.55 |
| Organic solvents | 7.47 |
| | 100.00 |

The mixture as a whole contained only 7.47% by weight of organic solvents. The ratio of NCO to OH groups was 1.0 and the pot life was several hours. Films applied in a wet layer thickness of 100 to 600 μm (corresponding to a dry film thickness of 25 to 180 μm) dried in 30 to 120 minutes to form a tack-free and defect-free film. The hardening process was complete after 7 to 14 days.

The hardened films of Examples 1a to 1c had the following properties:

| | 1a | 1b | 1c |
|---|---|---|---|
| Pendulum hardness, DIN 53 157 (sec) | 75 | 75 | 85 |
| Gloss, DIN 67 530 (angle 60) | 80 | 90 | 75 |
| Solvent resistance | | | |
| White spirit | very good | very good | very good |
| Toluene | very good | very good | very good |
| Methoxypropyl acetate | good-moderate | good | very good |
| Acetone | moderate | moderate | moderate |
| Ethanol | moderate | good-moderate | moderate |

EXAMPLE 2

100 parts by weight of polyhydroxyacrylate G having a solids content of 26.2% by weight, a viscosity of 1800 mPa.s at 23° C. and a pH value of 7.0 were homogeneously stirred with 8.0 parts by weight of demineralized water and 0.25 parts by weight of a commercial silicone-containing foam inhibitor (Foamex 1488, a product of Th. Goldschmidt AG, Essen).

A resin solution, which was slightly clouded because of the foam inhibitor, having an average flow viscosity (DIN 53 211) of 200 seconds and substantially indefinite storability was obtained.

Varying amounts of Polyisocyanate 1 were stirred into the resin solution to provide four different mixtures having NCO:OH ratios of A: 0.5 (addition of 5.57 parts by weight polyisocyanate 1)
B: 1.0 (addition of 11.51 parts by weight polyisocyanate 1)
C: 1.5 (addition of 17.26 parts by weight polyisocyanate 1)
D: 2.0 (addition of 23.00 parts by weight polyisocyanate 1)

Ready-to-use clear lacquers were obtained in each case having the following compositions:

|  | A | B | C | D |
|---|---|---|---|---|
| NCO:OH | 0.5 | 1.0 | 1.5 | 2.0 |
| Binder | 23.03 | 31.49 | 34.63 | 37.49 |
| Additive | 0.22 | 0.21 | 0.19. | 0.19 |
| Total solids | 28.25 | 31.70 | 34.83 | 37.68 |
| Water | 71.75 | 68.70 | 65.17 | 62.32 |
| Organic solvents | — | — | — | — |
|  | 100.0 | 100.0 | 100.0 | 100.0 |

Films of Examples 2A to 2D applied in a wet layer thickness of 100 to 600 μm (corresponding to a dry film thickness of 25 to 180 μm) dried in 30 to 120 minutes to form tack-free and defect-free films. The hardening process was complete in 7 to 14 days.

The hardened films of Examples 2A to 2D had the following properties.

|  | 2A | 2B | 2C | 2D |
|---|---|---|---|---|
| Gloss, DIN 67 530 (angle 60) | 100 | 100 | 100 | 100 |
| Pendulum hardness, DIN 53 157 (sec) | 50 | 60 | 85 | 100 |
| Solvent resistance |  |  |  |  |
| White spirit | very good | very good | very good | very good |
| Toluene | moderate | good | very good | very good |
| Methoxypropyl acetate | moderate | good | good | very good |
| Acetone | moderate-poor | moderate-poor | moderate-poor | good |
| Ethanol | moderate-poor | moderate-poor | moderate | very good |

EXAMPLE 3

100 parts by weight of polyhydroxyacrylate F having a solids content of 27.8% by weight, a viscosity of 5700 mPa.s at 23° C. and a pH value of 7.1 were mixed with 8.0 parts by weight of demineralized water, 0.25 parts by weight of a commercial, silicone-containing foam inhibitor (Foamex 1488, a product of Th. Goldschmidt AG, Essen), 0.3 parts by weight of a commercial dispersion aid (Pigmentverteiler A, a product of BASF, Ludwigshafen) and 20.0 parts by weight of a commercial titanium dioxide, rutile (Bayertitan R-KB4, a product of Bayer AG, Leverkusen) and the resulting mixture was dispersed for about 20 minutes in a mixer at a rotational speed of approximately 14 m/second. A dispersion having almost indefinite storability was obtained.

a. After the addition of 16.28 parts by weight of polyisocyanate b 2, a ready-to-use, white-pigmented, water-dilutable, two-component polyurethane paint was obtained having the following composition:

|  | By weight |
|---|---|
| Binder | 27.62 |
| Pigment | 13.81 |
| Additive | 0.38 |
| Total solids | 41.81 |
| Water | 55.38 |
| Organic solvents | 2.81 |
|  | 100.00 |

The ready-to-use paint contained only 2.81% by weight of organic solvents. The ratio of NCO:OH groups was 1.0 and the pot life was several hours.

Films applied in a wet-layer thickness of 180 μm (corresponding to a dry film thickness of approximately 50 μm) dried in 30 to 60 minutes to form tack-free and defect-free films. The hardening process was complete after about 7 to 14 days.

b. When polyisocyanate 1 was used as hardener for the described pigment dispersion, a ready-to-use white paint having the following composition was obtained:

|  | By weight |
|---|---|
| Binder | 28.42 |
| Pigment | 14.21 |
| Additive | 0.39 |
| Total solids | 43.02 |
| Water | 56.98 |
|  | 100.00 |

The ready-to-use two-component paint contained no organic solvent. The ratio of NCO:OH groups was 1.0 and the pot life was several hours.

Films applied in a wet layer thickness of 180 μm (corresponding to a dry film thickness of approximately 50 μm) dried in 30 to 60 minutes to form tack-free and defect-free films. The hardening process was complete after 7 to 14 days.

The properties of the films applied in accordance with Examples 3a and 3b were as follows:

|  | 3a | 3b |
|---|---|---|
| Pendulum hardness (sec) | approx. 65 | 110 |
| Gloss, DIN 67 530 (angle 60) | 85 | 85 |
| Solvent resistance |  |  |
| White spirit | very good | very good |
| Toluene | very good | very good |
| Methoxypropyl acetate | good-moderate | good-moderate |
| Acetone | moderate | moderate |
| Ethanol | moderate | moderate |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component coating composition wherein the binder components comprise
   a) a polyol component comprising an aqueous solution and/or dispersion of at least one polyacrylate containing hydroxyl groups and prepared from olefinically unsaturated compounds, said polyacrylate containing chemically incorporated groups comprising a member selected from the group consisting of carboxylate groups, sulfonate groups and mixtures of carboxylate and sulfonate groups in a quantity which is sufficient to make said polyacrylate soluble and/or dispersible in water and b) a polyisocyanate component containing free isocyanate groups and having a viscosity at 23° C. of about 50 to 10,000 mPa.s and comprising at least one organic polyisocyanate, wherein components a) and b) are present in quantities corresponding to an NCO:OH equivalent ratio of 0.5:1 to 5:1 and component b) is present in emulsified form in component a).

2. The coating composition of claim 1 wherein said polyacrylate has an average molecular weight $M_n$ of about 500 to 50,000, a hydroxyl value of 16.5 to 264 mg KOH/g of said polyacrylate, an acid value of 0 to 150 mg KOH/g of said polyacrylate and a content of said chemically incorporated groups of 5 to 417 milliequivalents per 100 g of said polyacrylate.

3. The coating composition of claim 2 wherein said polyisocyanate component exclusively contains aliphatically or cycloaliphatically bound isocyanate groups.

4. The coating composition of claim 1 wherein said polyisocyanate component exclusively contains aliphatically or cycloaliphatically bound isocyanate groups.

5. A process for the production of a two-component coating composition which comprises emulsifying a) a polyisocyanate component containing free isocyanate groups and having a viscosity at 23° C. of about 50 to 10,000 mPa.s and comprising at least one organic polyisocyanate b) in a polyol component comprising an aqueous solution and/or dispersion of at least one polyacrylate containing hydroxyl groups and prepared from olefinically unsaturated compounds, said polyacrylate containing chemically incorporated groups comprising a member selected from the group consisting of carboxylate groups, sulfonate groups and mixtures of sulfonate and carboxylate groups in a quantity which is sufficient to make said polyacrylate soluble and/or dispersible in water, wherein components a) and b) are present in quantities corresponding to an NCO:OH equivalent ratio of 0.5:1 to 5:1.

6. The process of claim 5 wherein said polyacrylate has an average molecular weight $M_n$ of about 500 to 50,000, a hydroxyl value of 16.5 to 264 mg KOH/g of said polyacrylate, an acid value of 0 to 150 mg KOH/g of said polyacrylate and a content of said chemically incorporated groups of 5 to 417 milliequivalents per 100 g of said polyacrylate.

7. The process of claim 6 wherein said polyisocyanate component exclusively contains aliphatically or cycloaliphatically bound isocyanate groups.

8. The process of claim 5 wherein said polyisocyanate component exclusively contains aliphatically or cycloaliphatically bound isocyanate groups.

* * * * *